June 3, 1941.   C. W. LEGUILLON   2,244,162
APPARATUS FOR REMOVING CURING BAGS
Filed Sept. 9, 1937   3 Sheets-Sheet 1

Inventor
Charles W. Leguillon
By Willis F. Avery
Atty

June 3, 1941.　　　　C. W. LEGUILLON　　　　2,244,162
APPARATUS FOR REMOVING CURING BAGS
Filed Sept. 9, 1937　　　3 Sheets-Sheet 2
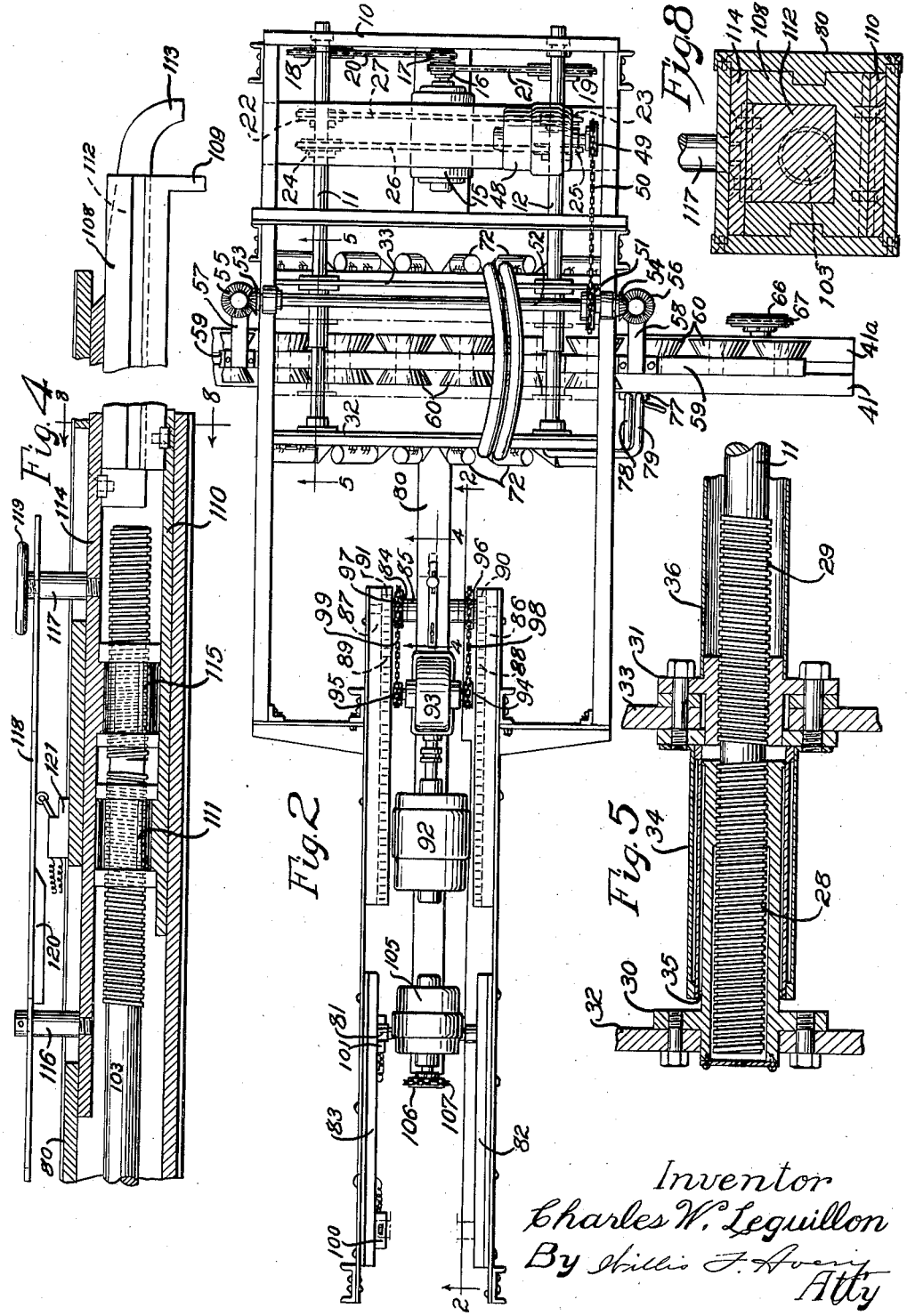
Inventor
Charles W. Leguillon
By Willis F. Avery
Atty June 3, 1941.   C. W. LEGUILLON   2,244,162
APPARATUS FOR REMOVING CURING BAGS
Filed Sept. 9, 1937   3 Sheets-Sheet 3
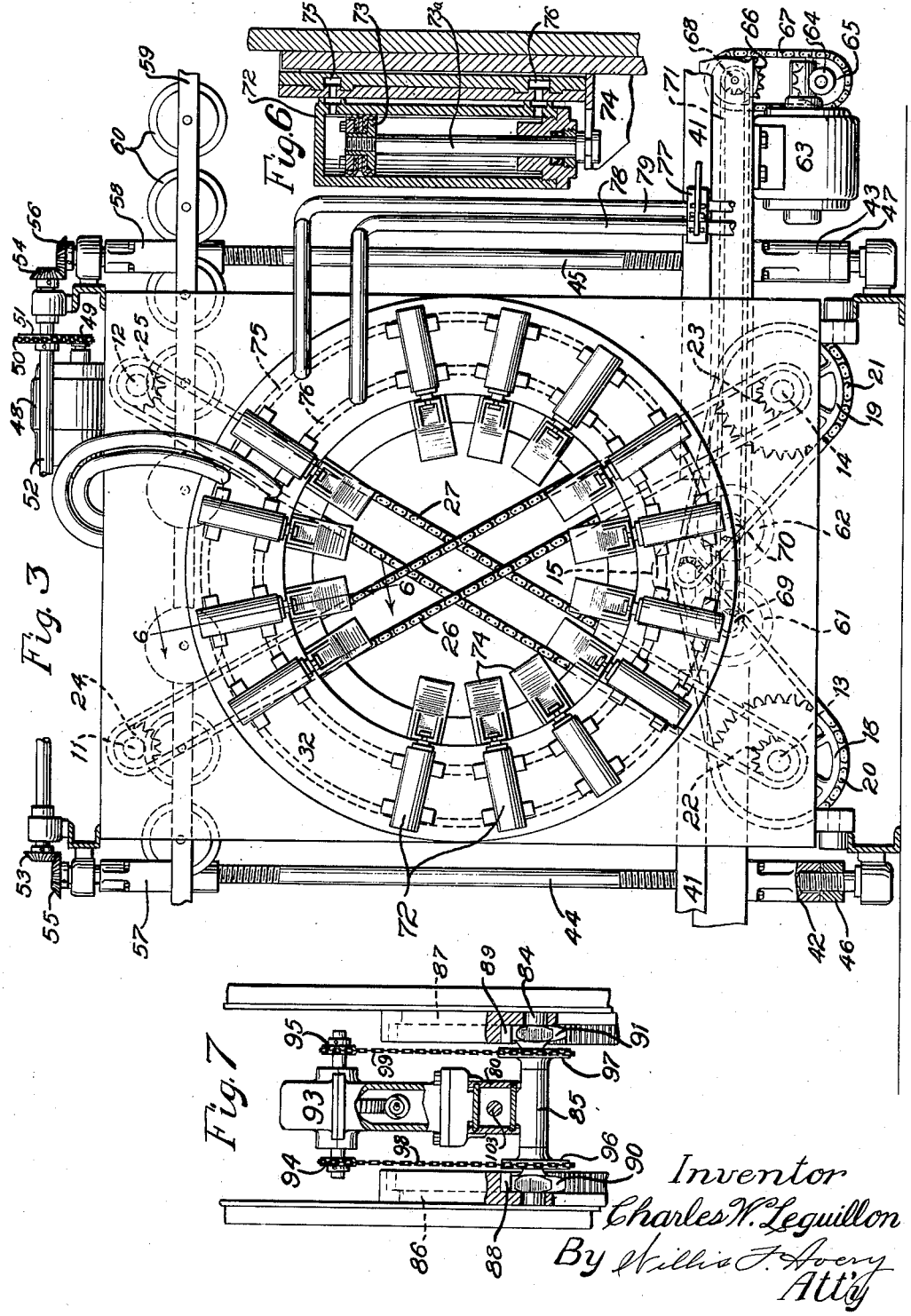

Patented June 3, 1941

2,244,162

UNITED STATES PATENT OFFICE 2,244,162

APPARATUS FOR REMOVING CURING BAGS

Charles W. Leguillon, Akron, Ohio, assignor to The B. F. Goodrich Company, New York, N. Y., a corporation of New York Application September 9, 1937, Serial No. 163,103

7 Claims. (Cl. 18—2)

This invention relates to apparatus for removing curing bags from the casings of pneumatic tires.

In the manufacture of pneumatic tire casings, it is usual to cure or vulcanize the tire while supported from within by an annular expansible bag inflated by air, steam, hot water, or other fluid. The removal of the bag from the vulcanized casing requires considerable force as the bead portions of the casing must be moved away from each other to permit the bag to be pulled from the tire, or the bag must be distorted to permit such removal, or both.

The principal objects of this invention are to provide for separation of the beads of the casing without injurious distortion of the bead portions, to provide for removal of the bag while the bead portions are so separated, to provide effective shielding of the bead portion while the bag is dragged over it, to provide adjustability of the apparatus to accommodate tires of different dimensions, and to effect economy of effort, accuracy of adjustment, and facility of operation.

These and other objects will appear from the following description and the accompanying drawings.

Of the drawings:

Fig. 2 is a plan view of the same.

Fig. 3 is a cross-sectional view taken on line 3—3 of Fig. 1 with the bag puller and tire casing omitted, parts being broken away.

Fig. 4 is a detail cross-sectional view of the bag puller, taken on line 4—4 of Fig. 2, parts being broken away.

Fig. 5 is a detail sectional view of the opening and closing mechanism taken on line 5—5 of Fig. 2, parts being broken away.

Fig. 6 is a detail sectional view of one of the bead holding cylinders, taken on line 6—6 of Fig. 3, parts being broken away.

Fig. 7 is a detail, sectional view of the bag puller, taken on line 7—7 of Fig. 1, parts being broken away.

Fig. 8 is a detail sectional view of the bag puller, taken on line 8—8 of Fig. 4.

Figure 1:
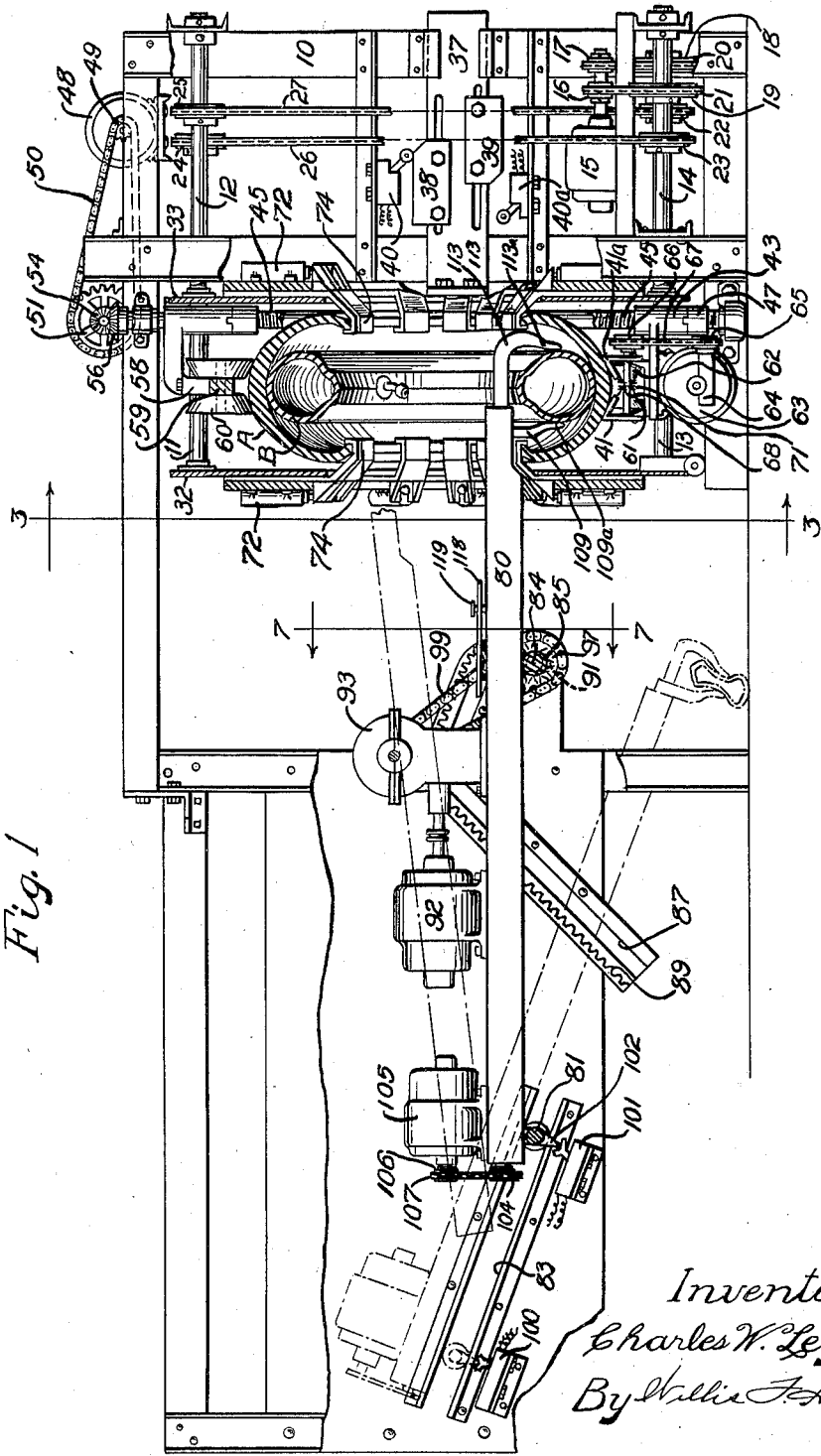
Fig. 1 is a side elevation of the apparatus, in its preferred form, with the tire casing and curing bag in place, the tire casing and curing bag, and part of the mechanism being shown in section on line 2—2 of Fig. 2, the full lines showing the bag puller as about to engage the bag, and other positions of the bag puller being indicated in dot and dash lines, parts being broken away.

Referring to the drawings, a frame 10, preferably of structural iron work, is provided with bearings for horizontally supporting four rotatable shafts, 11, 12, 13 and 14, arranged parallel to each other and held against axial movement by suitable collars fixed thereto and engaging the frame. The shafts are adapted to be driven in unison in either direction by an electric motor 15 as follows: Sprockets 16, 17 on the motor shaft drive shafts 13, 14 through sprockets 18, 19 fixed respectively to the shafts, and chains 20, 21. Shafts 11 and 12 are driven from shafts 14, 13 respectively, as by sprockets 22, 23 respectively on shafts 13, 14 driving sprockets 24, 25 on shafts 11, 12, respectively through chains 26, 27.

Shafts 11, 12, 13, 14 are formed with right and left screw threads 28, 29 (see Fig. 5) which engage threaded bushings 30, 31. Each shaft is similarly equipped and shaft 11 only is shown in detail and will be described. The bushings 30, 31 are fixed respectively to annular plate members 32, 33 simultaneously movable toward and from each other. To protect the screw threads from damage and foreign matter, the bushing 30 is made of elongated form and a telescoping tubular shield comprising a sleeve 34 attached to plate 33, and an enclosed tubular sleeve 35 adapted to float freely between the bushing 30 and the shield 34 are arranged over the shaft, stops being provided on each telescoping member to limit its movement. A dust shield 36, of tubular form is also fixed to bushing 31 and extends along the shaft over the threaded portion 29.

A sliding cam plate 37 is attached to annular plate 33 and extends in the direction of travel. A pair of cams 38, 39 are adjustably mounted thereon by bolts extending through slots extending therealong. A pair of limit switches 40, 40ª are mounted on the frame so as to be engaged by the cams 38, 39. These limit switches are in the control circuit of motor 15 and travel of the plates 32, 33 may be regulated by the setting of the cams. A push button starting switch is also connected in the circuit of motor 15. The arrangement is such that the operator may move the annular plates toward each other to the extent permitted by the setting of the cam 38 by pushing a button, or may move the plates apart to the extent permitted by the setting of cam 39 by pushing another button.

The tire casings to be operated upon are supported so as to be moved into position between the two annular plates 32, 33 from one side of the machine and to be removed from the other side. For this purpose a pair of guide rails 41, 41ᵃ are supported on a pair of brackets 42, 43 slidably mounted on vertically disposed threaded screw shafts 44, 45. Threaded bushings 46, 47, engage the threads on the shafts and support the brackets. The shafts 44, 45 may be rotated in unison by electric motor 48 through a sprocket 49 on the motor shaft and a chain 50 which drives a sprocket 51 on a horizontal shaft 52 rotatable in bearings on the frame of the machine. A pair of bevel gears 53, 54 fixed to shaft 52, engage a pair of bevel gears 55, 56 fixed respectively to shafts 44, 45.

Brackets 57, 58 at the upper ends of the shafts 44, 45 engage threads of the opposite hand on the shafts respectively, and support a horizontal rail 59. A series of guide rolls 60 are rotatably mounted on the rail 59. A pair of hour-glass shaped live rolls 61, 62 are rotatably supported between rails 41, 41ᵃ. The arrangement is such that by operation of the single motor 48, the upper and lower rails may be adjusted so that tires of different sizes will be engaged therebetween and centered with respect to the bead separating mechanism.

Rolls 61, 62 are driven by an electric motor 63 through a worm and gear speed reduction unit 64 and sprockets 65, 66 engaging a chain 67, and sprockets 68, 69 and 70 engaging a chain 71. The live rolls 61, 62 are located so as to contact with the bottom of the tire. The arrangement is such that by means of motor 63, the tire in the machine may be rotated at will by the operator to adjust it for the bag pulling operation.

To provide for engaging the beads of the tire, each of the annular plate members 32, 33 has mounted thereon and radially disposed with respect thereto, a series of air cylinders 72, each equipped with a piston 73 and piston rod 73ᵃ. Each piston rod has a bead engaging hook 74 fixed thereto and slidably engaging the annular plate. The cylinders are closely spaced except permissibly for one or more positions near the top of the tire so as to engage the beads of the tire at close intervals to avoid bending of the beads, the space being provided where the valve stem of the bag is to be positioned. Each cylinder is double-acting and the cylinders are connected by annular manifolds 75, 76 to a four-way control valve 77 by flexible pipes 78, 79 which permit movement of the annular plates. The arrangement is such that by adjusting the valve to one position all of the hooks are moved radially toward the center so as to permit their passing inside the beads of the tire and by moving the valve to a second position the hooks are moved radially outward to engage over the beads. After the hooks are engaged over the beads the annular plates 32, 33 may be moved apart so as to spread open the tire. The close spacing of the hooks 74 circumferentially about the bead portion, especially in the region of the two quadrants adjacent the position of the puller bar 80, is for the stated purpose of effectively shielding the bead portion of the tire while the bag is dragged over it. Whereas this is not so necessary in tire casings of large bead diameters in relation to the cross sectional width of the casing, it is of decided advantage in the removal of bags of relatively large cross sectional width from casings of relatively small bead diameters owing to the severe stresses imposed at the tire beads by the necessary collapsing of the bag as it is drawn through the tire bead opening. As is shown in Figs. 1 and 3 of the drawings the fingers or hooks 74 are so close together in the lower half of the circumference and in the portion diametrically opposite the puller bar, that any exposed bead portion between these fingers is of very considerably less extent than the cross sectional width of the bag and even considerably less than the cross sectional radius of the bag so that injurious contact of the bag as it is dragged over the bead portion is avoided. The most vulnerable region requiring this protection has been found to be that in the two quadrants adjacent the puller bar, which is the vicinity of the ten lower-most fingers of Fig. 1, although it is desirable to provide this protection also in the region of the four fingers grouped together at the upper portion of the circumference of Fig. 3, diametrically opposite the puller bar 80. By this construction bag removal is effected without bead distortion or bead abrasion even though the casings have small bead diameters and the bags are of large cross sectional thickness.

The apparatus for removing the bag from the casing comprises a puller bar and means for manipulating it into and out of the casing. The puller bar 80 is pivoted about a shaft 81 which is horizontally disposed between inclined guide ways 82, 83 fixed to the frame of the machine. Another horizontally disposed shaft 84 is rotatably mounted in a bearing 85 fixed to the bar 80 and has its ends disposed within parallel guide ways 86, 87 of substantially inverted V-shape and provided with rack teeth 88, 89 along their respective paths. A pair of pinions 90, 91 fixed to shaft 84 engage the respective racks. An electric motor 92 drives the shaft 84 through a worm and gear speed reducer 93 and a pair of sprockets 94, 95 thereon driving sprockets 96, 97 fixed to shaft 84 through chains 98, 99. A pair of reversing switches 100, 101 are mounted along the guide way 83 so as to be tripped by a projection 102 on shaft 81. These switches control the rotation of motor 92, the arrangement being such that when the motor 92 is started with the bar 80 in the dot and dash position of Fig. 1, the front end of the bar is raised and moved toward the tire and then is lowered toward the bag in the tire. The motor 92 then reverses and the bar is retracted through a reverse movement.

The bar 80 is preferably of square cross section and is hollow. A right and left hand lead screw 103 extends lengthwise therethrough and is retained at the rear end of the bar against longitudinal movement. A sprocket 104 fixed thereto is driven by a motor 105 mounted on the bar, through a sprocket 106 on the motor shaft and a chain 107. A slide 108, U-shape in cross section, is fitted within the forward end of the bar to slide lengthwise thereof. It is formed with a bag engaging finger 109 depending therefrom. A strap 110, fixed to the slide at one end, has a nut 111 attached thereto and engaging the left hand thread of shaft 103. A second slide 112 is slidably mounted within the slide 108 and has a depending bag-engaging finger 113 formed thereon. A strap 114 is fixed to the slide 112 and carries a nut 115 which engages the right hand thread of shaft 103. The arrangement is such that by rotation of shaft 103 the fingers 109 and 113 are forced toward each other to grasp a portion of the bag or are moved apart at will.

The depending fingers 109 and 113 preferably extend downwardly a sufficient distance to grasp the bag throughout a major part of its radial extent so that a large part of the radial extent of the bag will be wedged between the fingers. The wedging is assisted by the lateral stiffness of the inner peripheral portion of the bag, this portion usually being made stiffer in bags of this character. For further assisting the wedging action the lower ends of the fingers preferably have portions 109a and 113a extending inwardly toward each other as shown in Fig. 1.

To limit the opening movement of the fingers 109, 113, a stud 116 is fixed to strap 114 and extends through a slot in bar 80. A similar stud 117 is fixed to strap 114 and extends through another slot in bar 80. A slotted cam plate 118 is adjustably secured to said studs by a hand-wheel nut 119 so as to be adjustable lengthwise of bar 80. A cam 120 on the cam plate is adapted to engage a limit switch 121 fixed to the bar 80. This limit switch is in the circuit of motor 105. The arrangement is such that by loosening the hand-wheel nut 119, the cam 120 may be adjusted lengthwise along the bar 80 to a position where the switch 121 will be opened when the fingers 109, 113 have been separated the desired amount to receive the bag within the tire.

Hand-operated button switches are provided in a convenient location so that the operator may start and stop the motors 15, 48, 63, 92 and 105.

The operation of the apparatus is as follows:

With the annular plates spaced far apart and the bag pulling bar 80 in its withdrawn position, a tire casing A containing a curing bag B is rolled along the rails 40, 41 to a position between the annular plates 32, 33, the rails 40, 41 being raised or lowered, if necessary, by operating the motor 48, to adjust the guide rails and rollers to the size of the tire to be operated upon. The motor 63 is then operated to rotate the tire until the valve stem of the bag is near the top of the tire and located in one of the spaces between the bead engaging hooks provided to clear the stem. With the pistons of the cylinders 72 advanced to move the hooks toward the center, the motor 15 is started in a direction to move the annular plates 32, 33 toward each other until cam 39 opens the limit switch 40a, cam 39 having been set so that at the stopping position of the annular plates the bead engaging hooks are between the beads of the tire casing. Valve 77 is now operated to withdraw the hooks 74 from their innermost position to a position where they engage over the tire beads. Motor 15 is then started in the opposite direction to spread the beads apart, the movement ending when the limit switch 40 is opened.

With the tire casing held in opened position the bag pulling bar 80 is advanced toward the tire by starting motor 92, the fingers 109, 113 being separated. The forward end of the bar enters the wheel space within the tire and is automatically lowered to bag engaging position as shown in Fig. 1. Thereupon motor 105 is started to cause the fingers 109, 113 to move toward each other to grip the bag. The bar 80 is then raised pulling the clamped portion of the bag therewith and then withdrawn to its original position as shown in dot and dash lines in Fig. 1. Motor 105 is then operated in a reverse direction to release the bag which is deposited on the floor or upon a suitable conveyor, not shown. Valve 77 is then operated to release the bead engaging hooks from the tire casing and the tire casing is rolled farther along rails 41, 41a and out of the machine.

The fingers 109, 113 grasp the bag over a considerable extent radially thereof and retain it by a wedging of such portion between them as is shown in the broken lines in Fig. 1, so that injury to the bag is avoided, such as would be likely if the bag were retained by a localized pinching of a small portion of the bag. The close spacing of the hooks 74, 74 about the lowermost portion and sides of the circumference of the bead portion through which the bag is pulled out results in an effective shielding of the bead portion against injurious scraping of the bag against the bead portion.

Variations may be made without departing from the scope of the invention as it is hereinafter claimed.

I claim:

1. Apparatus for removing a bag from a tire casing, said apparatus comprising means for pinching the bag and withdrawing it from the casing, and means for preventing injurious distortion of the bead portion of the casing through which the bag is withdrawn and for protecting said bead portion from abrasion by the bag throughout arcs of substantial extent of the bead circumference.

2. Apparatus for removing an annular bag from an annular tire casing comprising means for engaging the bag at a position thereon and removing the same from the casing, and means for holding the bead portions of the casing apart and protecting the same during the bag-removing operation comprising a plurality of bead-covering elements arranged in such close relation circumferentially of the casing that at least in the half circumference of the casing as to which the said position of bag-engagement is centrally located any exposed bead portion of said casing is less in circumferential extent than the cross-sectional width of the bag.

3. Apparatus as defined in claim 2 in which the said bead-covering elements are duplicated for engaging the two bead portions of the casing and means are provided for moving the elements radially and for moving them axially with respect to the tire casing.

4. Apparatus for removing a hollow flexible annular forming bag from a tire casing, said apparatus comprising means for grasping the bag and withdrawing it from the casing, means for supporting the casing, and means for separating the bead portions of the casing, said first mentioned means comprising a pair of movable fingers adapted to grasp the bag between them, said fingers having wedge surfaces cooperating during the grasping to wedge between them a portion of the bag at its inner periphery, a movable pulling bar for supporting said fingers, means on said bar for controlling said fingers in a grasping movement, and means for manipulating said bar to bring said fingers into and out of grasping relation with respect to the bag.

5. Apparatus for removing a hollow flexible annular forming bag from a tire casing, said apparatus comprising means for grasping the bag and withdrawing it from the casing, means for supporting the casing, and means for separating the bead portions of the casing, said first mentioned means comprising a movable pulling bar, a pair of movable fingers carried by said bar and adapted to grasp the bag between them, said fingers having wedge surfaces cooperating during the grasping to wedge between them a portion of the bag at its inner periphery, means on said puller bar for manipulating the fingers in their grasping movements and means for manipulating said bar to bring said fingers into and out of grasping relation with respect to the bag.

6. Apparatus for removing a hollow flexible annular forming bag having a thickened inner periphery from a tire casing, said apparatus comprising means for grasping the bag and withdrawing it from the casing, a structure for supporting the casing, and means for separating the bead portions of the casing, said first mentioned means comprising a movable pulling bar, a pair of movable fingers carried by said bar and adapted to grasp the bag between them radially outward of its thickened inner periphery, means on said puller bar for moving a finger toward the other to grasp the bag by pinching it between them and means for manipulating said bar to bring the said fingers into and out of grasping relation with respect to the bag.

7. Apparatus for removing an annular bag from an annular tire casing comprising means for engaging the bag at a limited area thereof and removing the bag from the casing, and means for holding the bead portion of the casing apart and protecting the same during the bag-removing operation comprising a plurality of bead-covering elements, certain of which elements are arranged throughout at least the half circumference of the casing as to which said limited area of the bag is intermediately located and in such close relation circumferentially of the casing as to protect the bead of the tire from injury during bag-removal, and certain of which elements are arranged at a zone of the tire casing diametrically opposed to said area.

CHARLES W. LEGUILLON.